(12) United States Patent
Yamamoto et al.

(10) Patent No.: US 11,003,371 B2
(45) Date of Patent: May 11, 2021

(54) OPTICAL DISC DEVICE, OPTICAL DISC ROTATION POSITION DETECTION METHOD, AND OPTICAL DISC HAVING ROTATION REFERENCE MARK FORMED AS WIDTH CHANGING IN RADIAL DIRECTION

(71) Applicant: JVCKENWOOD Corporation, Yokohama (JP)

(72) Inventors: Masahiro Yamamoto, Yokohama (JP); Shigehiko Iwama, Yokohama (JP); Atsushi Saito, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/695,800

(22) Filed: Nov. 26, 2019

(65) Prior Publication Data
US 2020/0167090 A1    May 28, 2020

(30) Foreign Application Priority Data
Nov. 28, 2018 (JP) .............................. JP2018-222294

(51) Int. Cl.
| G11B 7/24 | (2013.01) |
| G06F 3/06 | (2006.01) |
| G11B 7/007 | (2006.01) |

(52) U.S. Cl.
CPC .......... *G06F 3/0634* (2013.01); *G06F 3/0607* (2013.01); *G06F 3/0677* (2013.01);
(Continued)

(58) Field of Classification Search
None
See application file for complete search history.

(56) References Cited

U.S. PATENT DOCUMENTS

| 4,866,692 A * | 9/1989 | Saito ................. G11B 11/10528 |
| | | 369/59.12 |
| 5,444,371 A * | 8/1995 | Tomisaki ............. G11B 21/106 |
| | | 324/212 |

(Continued)

FOREIGN PATENT DOCUMENTS

| EP | 3483587 A1 | 5/2019 |
| JP | 2002-521666 A | 7/2002 |

(Continued)

OTHER PUBLICATIONS

Search Report dated May 7, 2020 issued in corresponding European Application No. 19211309.0.

*Primary Examiner* — Tan X Dinh
(74) *Attorney, Agent, or Firm* — Nath, Goldberg & Meyer; Jerald L. Meyer

(57) ABSTRACT

An optical disc device capable of detecting a reference position of an optical disc in a rotating direction includes an optical disc rotation drive unit, an optical sensor, and a control circuit. The optical disc rotation drive unit rotates the optical disc provided with a rotation reference mark. The rotation reference mark is formed into a shape having a width changing in the radial direction of the optical disc. The optical sensor detects the rotation reference mark. The control circuit controls the optical disc rotation drive unit and the optical sensor, extracts a detection signal of the rotation reference mark as a pulse waveform from an output signal of the optical sensor with the optical disc being rotated, and specifies a rotation reference position of the optical disc in accordance with the pulse waveform.

2 Claims, 11 Drawing Sheets

(52) U.S. Cl.
CPC ............... *G11B 7/24* (2013.01); *G11B 7/007* (2013.01); *G11B 2007/240012* (2013.01)

(56) References Cited

U.S. PATENT DOCUMENTS

| | | | |
|---|---|---|---|
| 6,970,400 B1* | 11/2005 | Wakabayashi | G11B 5/012 369/13.2 |
| 9,953,806 B1 | 4/2018 | Carson et al. | |
| 2004/0141445 A1* | 7/2004 | Hanks | G11B 27/36 369/53.29 |
| 2007/0047403 A1* | 3/2007 | Hanks | G11B 7/24 369/44.37 |
| 2008/0298222 A1* | 12/2008 | Hirose | G11B 5/743 369/275.4 |
| 2009/0097387 A1* | 4/2009 | Sabi | G11B 7/243 369/275.3 |
| 2015/0116690 A1* | 4/2015 | Wang | G03F 7/70141 355/77 |
| 2015/0318011 A1* | 11/2015 | Onoe | G11B 7/00781 369/44.32 |
| 2018/0217175 A1 | 8/2018 | Iwama et al. | |

FOREIGN PATENT DOCUMENTS

| | | | | |
|---|---|---|---|---|
| JP | 2006-322819 A | | 11/2006 | |
| JP | 2017138186 A | * | 8/2017 | ............ G01N 33/53 |
| JP | 2018136297 A | * | 8/2018 | |

* cited by examiner (a)  (b)  (c)

(a)  (b)  (c)

OPTICAL DISC DEVICE, OPTICAL DISC ROTATION POSITION DETECTION METHOD, AND OPTICAL DISC HAVING ROTATION REFERENCE MARK FORMED AS WIDTH CHANGING IN RADIAL DIRECTION

CROSS REFERENCE TO RELATED APPLICATION

This application is based upon and claims the benefit of priority under 35 U.S.C. § 119 from Japanese Patent Application No. 2018-222294 filed on Nov. 28, 2018, the entire contents of which are incorporated herein by reference.

BACKGROUND

The present disclosure relates to an optical disc device, an optical disc rotation position detection method, and an optical disc.

Immunoassays are known that quantitatively analyze disease detection and therapeutic effects by detecting particular antigens or antibodies as specimens associated with diseases. Japanese Translation of PCT International Application Publication No. 2002-521666 (hereinafter referred to as Patent Document 1) and Japanese Patent Application Publication No. 2006-322819 (hereinafter referred to as Patent Document 2) disclose an optical disc device in which antibodies that are fixed to a reaction region on an optical disc are allowed to bind to antigens in a sample, so that the antigens are labeled by nanoparticles having antibodies.

The optical disc device scans and detects the nanoparticles captured on the reaction region on the optical disc with laser light emitted from an optical pickup. The optical disc device disclosed in Patent Documents 1 and 2 serves as an analysis device for detecting a specimen.

The optical disc device moves the optical pickup in a radial direction of the optical disc being rotated. Since the optical disc is provided thereon with a plurality of reaction regions, a reaction region in which nanoparticles are detected needs to be specified. The optical disc device disclosed in Patent Document 1 specifies a corresponding reaction region by use of address information of the optical disc. Patent Document 2 discloses that the optical disc includes a group of pits in which positional information on reaction regions is recorded.

The optical disc device as disclosed in Patent Documents 1 and 2 thus needs to preliminarily record the address information for specifying the positions of the reaction regions on the optical disc. This complicates the process of manufacturing the optical disc, increasing manufacturing costs of the optical disc accordingly.

SUMMARY

A first aspect of one or more embodiments provides an optical disc device including: an optical disc rotation drive unit configured to rotate an optical disc provided with a rotation reference mark; an optical sensor configured to detect the rotation reference mark; and a control circuit configured to control the optical disc rotation drive unit and the optical sensor, the rotation reference mark being formed into a shape having a width changing in a radial direction of the optical disc, the control circuit being configured to extract a detection signal of the rotation reference mark as a pulse waveform from an output signal of the optical sensor with the optical disc being rotated, and specify a rotation reference position of the optical disc in accordance with the pulse waveform.

A second aspect of one or more embodiments provides an optical disc rotation position detection method including: causing an optical disc rotation drive unit to rotate an optical disc provided with a rotation reference mark formed into a shape having a width changing in a radial direction of the optical disc; causing an optical sensor to detect the rotation reference mark; and causing a control circuit to extract a detection signal of the rotation reference mark as a pulse waveform from an output signal of the optical sensor with the optical disc being rotated, and specify a rotation reference position of the optical disc in accordance with the pulse waveform.

A third aspect of one or more embodiments provides an optical disc including a rotation reference mark for specifying a rotation reference position of the optical disc, the rotation reference mark being formed into a shape having a width changing in a radial direction of the optical disc.

DETAILED DESCRIPTION

Figure 1:
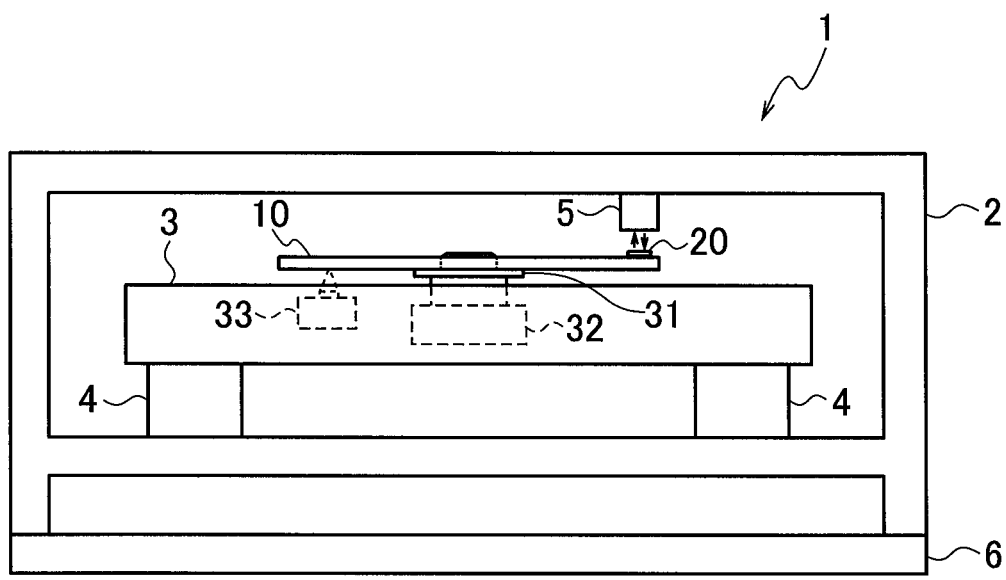
FIG. 1 is a configuration diagram showing an optical disc device according to an embodiment as viewed from the side.

A configuration of an optical disc device according to an embodiment is described below with reference to FIG. 1.

The optical disc device 1 includes a casing 2, a traverse mechanism 3, a damping member 4, an optical sensor 5, and a control circuit 6. The traverse mechanism 3 is housed and fixed to the casing 2 via the damping member 4. A damper rubber may be used as the damping member 4. The damping member 4 absorbs oscillation of the casing 2 to avoid further propagation of the oscillation to the traverse mechanism 3. The optical sensor 5 is fixed to the casing 2.

The control circuit 6 is electrically connected to the traverse mechanism 3 and the optical sensor 5. The control circuit 6 controls the traverse mechanism 3 and the optical sensor 5. An optical disc drive circuit board may be used as the control circuit 6. The traverse mechanism 3 includes a turntable 31, a rotation drive unit 32, and an optical pickup 33. A motor may be used as the rotation drive unit 32.

The control circuit 6 controls to cause the traverse mechanism 3 to move and set an optical disc 10 onto the turntable 31, or remove the optical disc 10 set on the turntable 31 from the traverse mechanism 3. The traverse mechanism 3 rotates the turntable 31 at a predetermined rotation rate or at a constant angular velocity, or moves the optical pickup 33 to a predetermined position in the radial direction of the optical disc 10.

The traverse mechanism 3 rotates the turntable 31 to serve as an optical disc rotation drive unit for rotating the optical disc 10. The traverse mechanism 3 can adjust a focal point of laser light emitted to the optical disc 10 from the optical pickup 33.

Figure 2A:
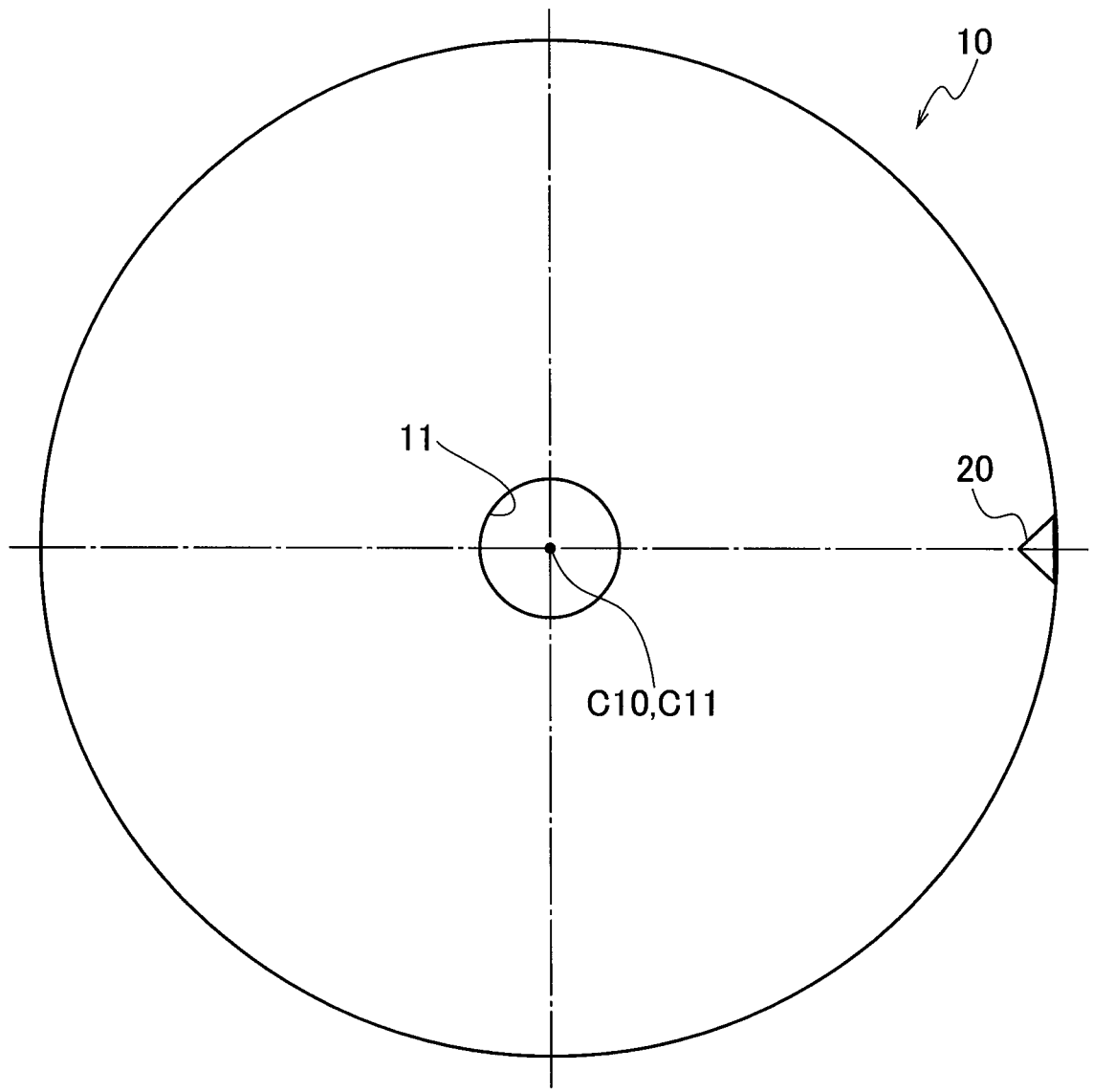
FIG. 2A is a plan view showing an example of an optical disc.
Figure 2B:
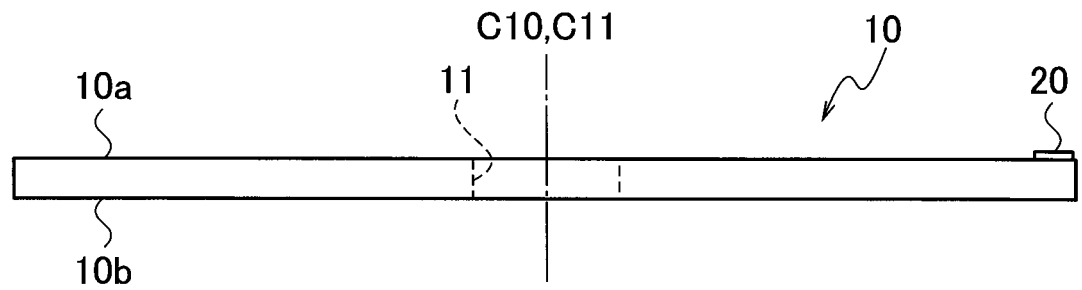
FIG. 2B is a side view showing the example of the optical disc.

A configuration example of the optical disc according to the embodiment is described below with reference to FIG. 2A and FIG. 2B. The optical disc 10 has a first surface 10a, a second surface 10b, and a central hole 11. The center C11 of the central hole 11 conforms to the rotational center C10 of the optical disc 10. The first surface 10a is provided with a rotation reference mark 20. The rotation reference mark 20 is preferably, located at or around the circumference of the optical disc 10. The optical sensor 5 is arranged at a position capable of detecting the rotation reference mark 20.

The second surface 10b on the opposite side of the first surface 10a is provided with tracks for recording and reading out pieces of information, or provided with reaction regions. As used herein, the "reaction region" refers to a region in which antigens as detection target substances are to be captured and sandwiched between antibodies fixed to the optical disc 10 and nanoparticles. The detection target substances and the nanoparticles sometimes are not captured in some of the reaction regions. The reaction regions are used tier capturing the detection target substances and the nanoparticles. The optical pickup 33 is movably positioned within a range capable of recording and reading out pieces of information or within a range capable of detecting the reaction regions in the radial direction of the optical disc 10.

Figure 3A:
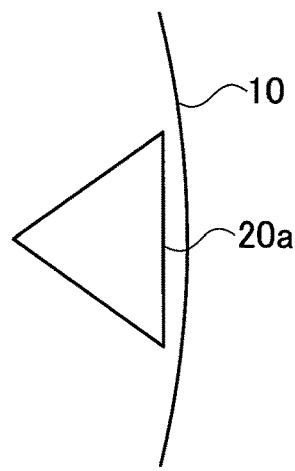
FIG. 3A is a view showing an example of a rotation reference mark.
Figure 3B:
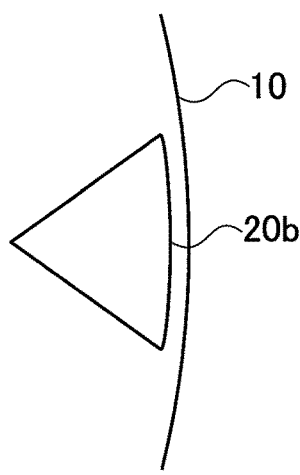
FIG. 3B is a view showing another example of the rotation reference mark.
Figure 3C:
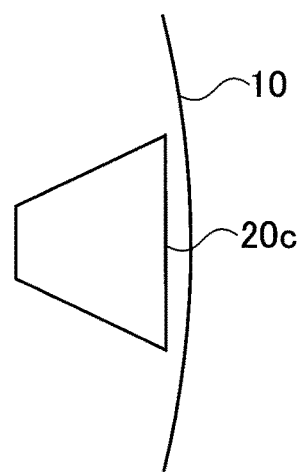
FIG. 3C is a view showing still another example of the rotation reference mark.
Figure 3D:
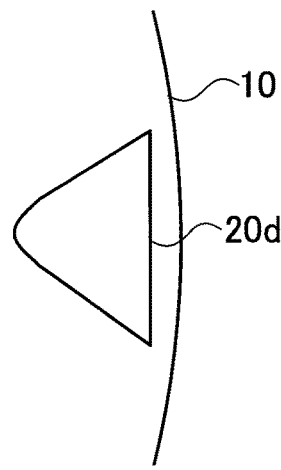
FIG. 3D is a view showing still another example of the rotation reference mark.

The rotation reference mark 20 is described below with reference to FIG. 3A to FIG. 3J. FIG. 3A is an enlarged view of the rotation reference mark 20 shown in FIG. 2A. FIG. 3B to FIG. 3J are views showing other examples of the rotation reference mark 20. For making a distinction, the respective rotation reference marks are indicated by the reference numerals 20a to 20j corresponding to FIG. 3A to FIG. 3J.

The rotation reference mark 20a shown in FIG. 3A has a triangular shape with a width increasing from the inner circumference to the outer circumference of the optical disc 10. The rotation reference mark 20b shown in FIG. 3B has a sector-like shape with a width increasing from the inner circumference to the outer circumference of the optical disc 10. The rotation reference mark 20c shown in FIG. 3C has a trapezoidal shape with a width increasing from the inner circumference to the outer circumference of the optical disc 10. The rotation reference mark 20d shown in FIG. 3D has a shape with a width increasing from the inner circumference to the outer circumference of the optical disc 10, having two acute-angled parts and one U-shaped part.

Figure 3E:
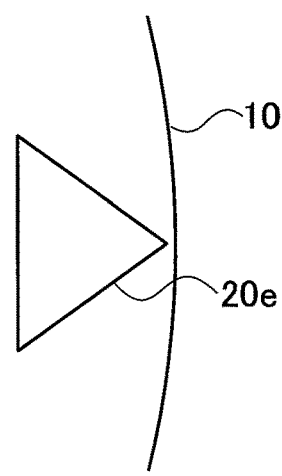
FIG. 3E is a view showing still another example of the rotation reference mark.
Figure 3F:
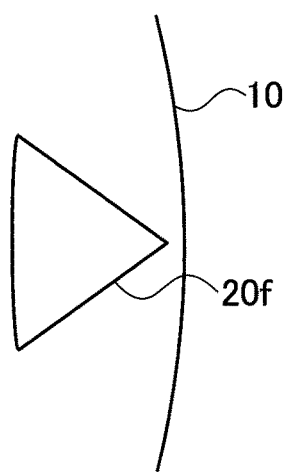
FIG. 3F is a view showing still another example of the rotation reference mark.
Figure 3G:
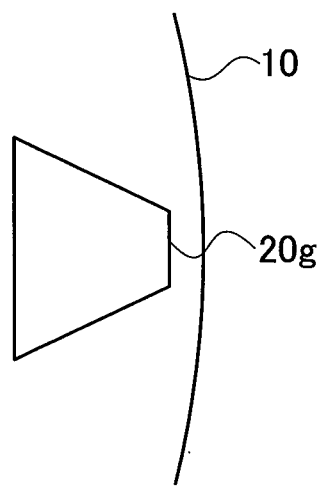
FIG. 3G is a view showing still another example of the rotation reference mark.
Figure 3H:
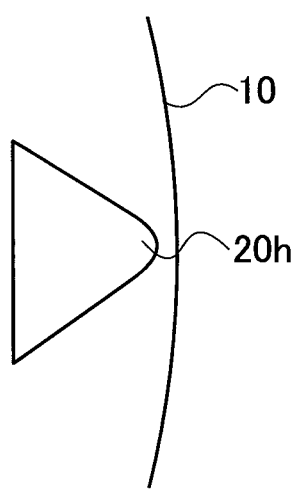
FIG. 3H is a view showing still another example of the rotation reference mark.

The rotation reference mark 20e shown in FIG. 3E has a triangular shape with a width decreasing from the inner circumference to the outer circumference of the optical disc 10. The rotation reference mark 20f shown in FIG. 3F has a sector-like shape with a width decreasing from the inner circumference to the outer circumference of the optical disc 10. The rotation reference mark 20g shown in FIG. 3G has a trapezoidal shape with a width decreasing from the inner circumference to the outer circumference of the optical disc 10. The rotation reference mark 20h shown in FIG. 3H has a shape with a width decreasing from the inner circumference to the outer circumference of the optical disc 10, having two acute-angled parts and one U-shaped part.

Figure 3I:
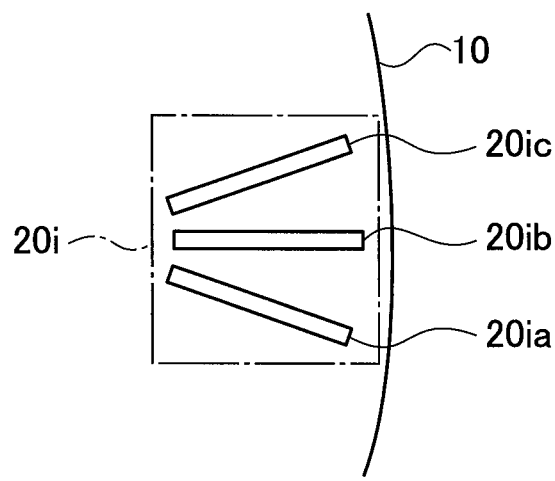
FIG. 3I is a view showing still another example of the rotation reference mark.

The rotation reference mark 20i shown in FIG. 3I includes a plurality of patterns 20ia to 20ic arranged at intervals along the periphery (in the circumferential direction) of the optical disc 10, the respective intervals changing in width in the radial direction of the optical disc 10. The respective patterns 20ia to 20ic are formed into a rectangular strip, for example, with the intervals gradually widened from the inner circumference to the outer circumference of the optical disc 10. The rotation reference mark 20i thus entirely has a shape with a width increasing from the inner circumference to the outer circumference of the optical disc 10.

Figure 3J:
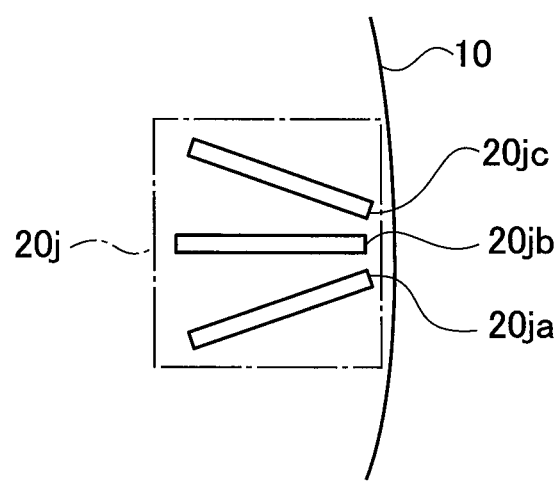
FIG. 3J is a view showing still another example of the rotation reference mark.

The rotation reference mark 20j shown in FIG. 3J includes a plurality of patterns 20ja to 20jc arranged at intervals along the periphery (in the circumferential direction) of the optical disc 10, the respective intervals changing in width in the radial direction of the optical disc 10. The respective patterns 20ja to 20jc are formed into a rectangular strip, for example, with the intervals tapering from the inner circumference to the outer circumference of the optical disc 10. The rotation reference mark 20j thus entirely has a shape with a width decreasing from the inner circumference to the outer circumference of the optical disc 10.

The respective rotation reference marks 20a to 20j are common in that the width changes in the radial direction of the optical disc 10. The rotation reference mark 20 thus has a shape with a width changing in the radial direction of the optical disc 10. The rotation reference mark 20 (20a to 20j) may be either in contact with or separated from the outer circumferential edge of the optical disc 10.

The rotation reference mark 20 (20a to 20j) may be formed such that a reflective film (such as an aluminum mm) is coated on the first surface 10a of the optical disc 10 (by vapor deposition, for example) and is then subjected to patterning by photolithography. Alternatively, the rotation reference mark 20 (20a to 20j) may be formed such that a reflective film (such as an aluminum film) is coated on the first surface 10a of the optical disc 10 by masking and patterning (by vapor deposition, for example).

Alternatively, the rotation reference mark 20 (20a to 20j) may be formed such that a reflective member may be printed or applied into a predetermined shape on the first surface 10a of the optical disc 10, or a reflective member having a predetermined shape may be bonded to the first surface 10a of the optical disc 10. The reflective film or the reflective member is only required to be made of a material having optical reflectivity.

Detecting the position of the optical pickup 33 can specify the position on the optical disc 10 in the radial direction when the optical disc 10 has no address information. However, a reference position on the optical disc 10 in the rotating direction still needs to be detected in order to specify the position on the optical disc 10 in the track direction when having no address information.

As shown in FIG. 1, the traverse mechanism 3 is fixed to the casing 2 via the damping member 4, so as to block off the propagation of oscillation of the casing 2 to the traverse mechanism 3. The optical pickup 33 and the optical disc 10 are thus not influenced by the oscillation of the casing 2. The optical sensor 5 and the optical disc 10 could avoid receiving the influence of oscillation of the casing 2 even if the optical sensor 5 could be housed inside the traverse mechanism 3. However, the traverse mechanism 3 has substantially no space for housing the optical sensor 5. The traverse mechanism 3 then needs to be redesigned so as to leave a space for housing the optical sensor 5. Since housing the optical sensor 5 in the traverse mechanism 3 is not a practical way, the optical sensor 5 is thus to be fixed to the casing 2, as shown in FIG. 1.

The oscillation of the casing 2 is propagated to the optical sensor 5 which is fixed to the casing 2. The optical sensor 5, when influenced by the oscillation of the casing 2, decreases in accuracy of detecting the rotation reference mark 20 because of the oscillation. For dealing with this problem, an optical disc rotation position detection method according to the embodiment is illustrated below.

Example 1

Figure 4A:
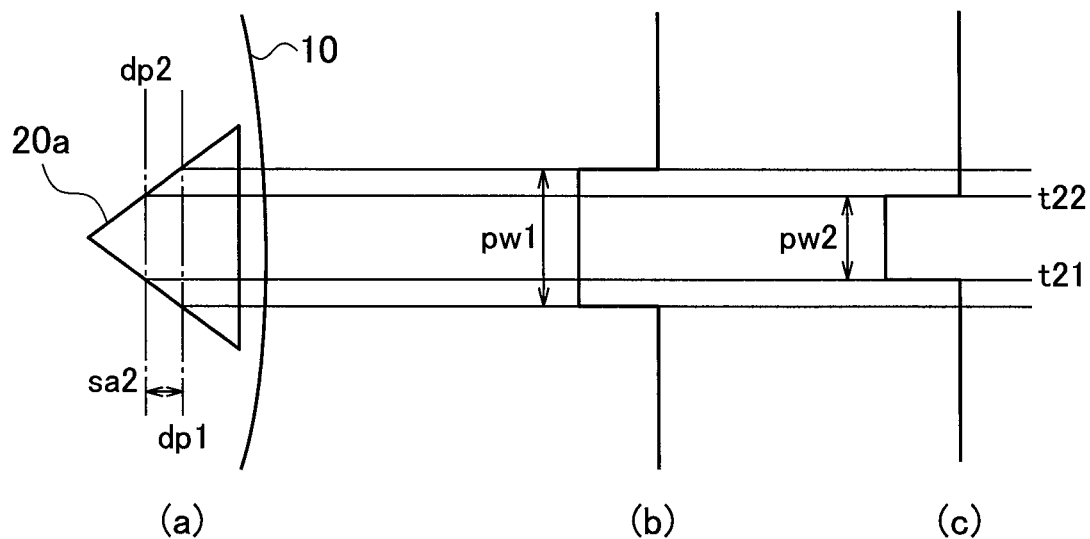
FIG. 4A is a view illustrating an optical disc rotation position detection method of Examples 1 and 2.
Figure 4B:
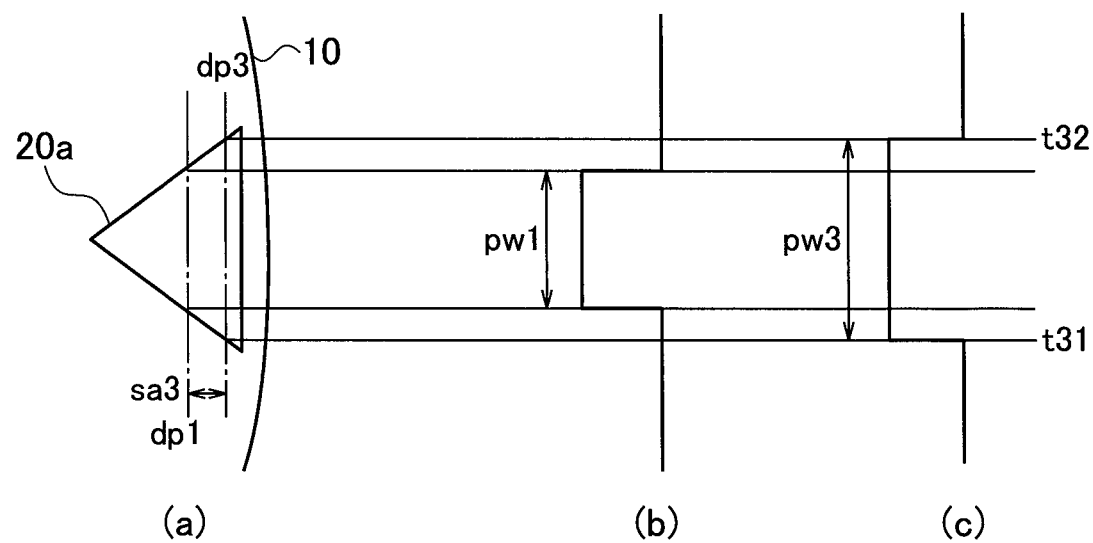
FIG. 4B is a view illustrating the optical disc rotation position detection method of Examples 1 and 2.

An optical disc rotation position detection method of Example 1 is described with reference to FIG. 4A, FIG. 4B, and the flowchart shown in FIG. 5. FIG. 4A is a view illustrating a case in which the optical sensor 5 is shifted from a targeted detection position dp1 to a detection position dp2 toward the center (the rotational center C10) of the optical disc 10 when receiving the influence of oscillation of the casing 2. FIG. 49 is a view illustrating a case in which the optical sensor 5 is shifted from the targeted detection position dp1 to a detection position dp3 toward the outer circumference of the optical disc 10 when receiving the influence of oscillation of the casing 2. FIG. 4A and FIG. 4B illustrate a state in which the rotation reference mark 20a shown in FIG. 3A is formed on the first surface 10a of the optical disc 10.

The section (a) shown in each of FIG. 4A and FIG. 49 illustrates a partly-enlarged region in the optical disc 10 in which the rotation reference mark 20a is formed. The section (b) shown in each of FIG. 4A and FIG. 49 illustrates an output signal of the optical sensor 5 corresponding to the targeted detection position dp1. The section (c) shown in FIG. 4A illustrates an output signal of the optical sensor 5 corresponding to the detection position dp2 shifted from the targeted detection position dp1. The section (c) shown in FIG. 4B illustrates an output signal of the optical sensor 5 corresponding to the detection position dp3 shifted from the targeted detection position dp1.

Figure 5:
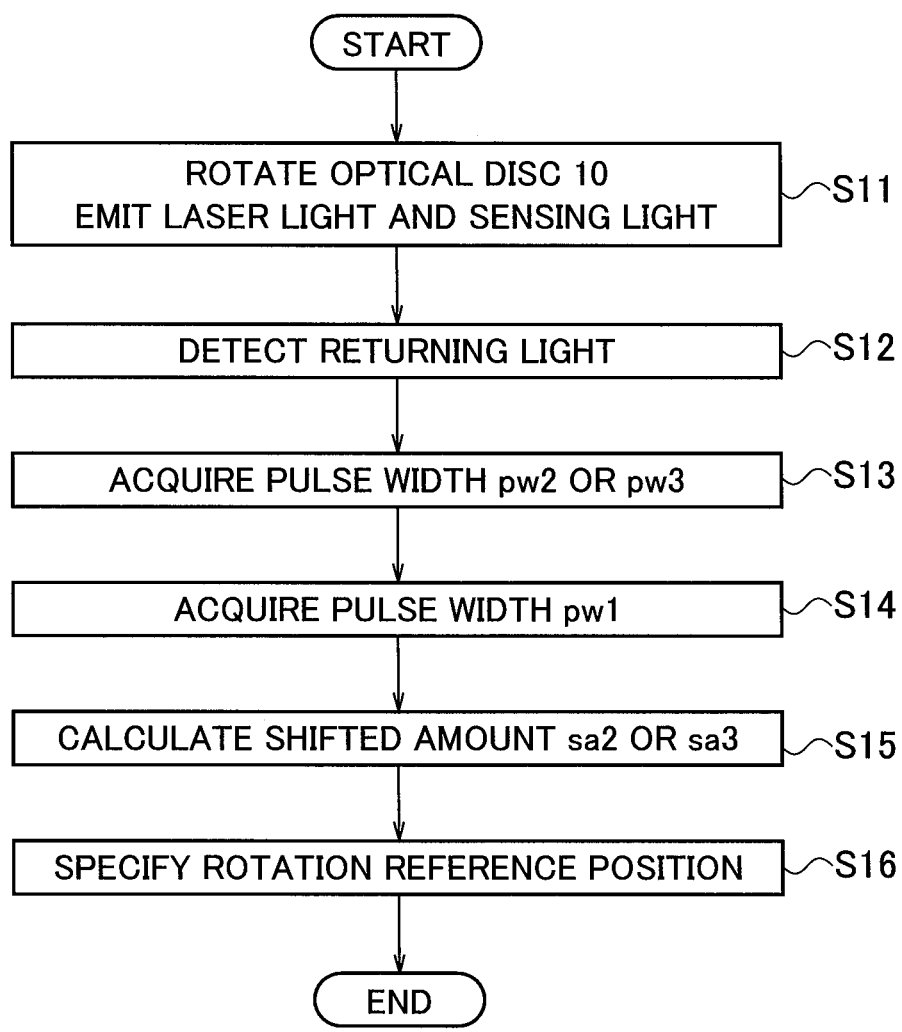
FIG. 5 is a flowchart illustrating the optical disc rotation position detection method of Example 1.

In step S11 in the flowchart shown in FIG. 5, the control circuit 6 controls the traverse mechanism 3 and the optical sensor 5. In particular, the control circuit 6 controls the traverse mechanism 3 to rotate the optical disc 10 and cause the optical pickup 33 to emit laser light to the optical disc 10. The control circuit 6 also controls the optical sensor 5 to emit sensing light to a region in the optical disc 10 in which the rotation reference mark 20 is located.

In step S12, the optical sensor 5 detects the returning light of the sensing light emitted to the optical disc 10 to generate an output signal. In step S13, the control circuit 6 extracts a detection signal of the rotation reference mark 20a as a pulse waveform from the output signal generated by the optical sensor 5, as shown in FIG. 4A or FIG. 4B. The control circuit 6 further acquires a pulse width pw2 or pw3 of the detection signal.

A pulse width pw1 of the detection signal when the optical sensor 5 is located at the targeted detection position dp1 can be calculated in accordance with the shape of the rotation reference mark 20a and a speed of rotation (rotation rate) of the optical disc 10 (the turntable 31).

In step S14, the control circuit 6 acquires a speed of rotation at the detection position dp1 in the optical disc 10 based on the speed of rotation of the turntable 31. The width of the rotation reference mark 20a at the targeted detection position dp1 can be preliminarily acquired according to the shape of the rotation reference mark 20a. The width of the rotation reference mark 20a at the targeted detection position dp1 corresponds to a distance between one end and the other end of the rotation reference mark 20a in the rotating direction of the optical disc 10 at the targeted detection position dp1.

The control circuit 6 acquires the pulse width pw1 of the detection signal in accordance with the acquired speed of rotation and the width of the rotation reference mark 20a at the targeted detection position dp1.

The control circuit 6 may calculate the pulse width pw1 of the detection signal in accordance with the acquired speed of rotation and the width of the rotation reference mark 20a at the targeted detection position dp1. The control circuit 6 may store a lookup table in which the speed of rotation is associated with the pulse width pw1 of the detection signal at the targeted detection position dp1. The control circuit 6 may acquire the pulse width pw1 of the detection signal from the lookup table in accordance with the acquired speed of rotation.

In step S15, the control circuit 6 compares the pulse width pw1 with the pulse width pw2 or pw3 so as to calculate the shifted amount sa2 or sa3 of the actual detection position dp2 or dp3 from the targeted detection position dp1.

In particular, the control circuit 6 calculates a difference between the pulse width pw1 with the pulse width pw2 or pw3, so as to calculate the shifted amount sa2 or sa3 of the detection position dp2 or dp3 from the detection position dp1 in accordance with the calculated difference.

In step S16, the control circuit 6 specifies the rotation reference position on the optical disc 10 in accordance with the shifted amount sa2 or sa3 of the detection position dp2 or dp3 from the detection position dp1, a rising point (falling point) t21 or t31 of the pulse waveform, and a falling point (rising point) t22 or t32 of the pulse waveform.

The optical disc rotation position detection method of Example 1 described above can specify the rotation reference position on the optical disc 10 in accordance with the calculated shifted amount sa2 or sa3 even if the optical sensor 5 is shifted from the targeted detection position dp1 in the radial direction of the optical disc 10 due to the influence of oscillation of the casing 2.

Example 2

Figure 6:
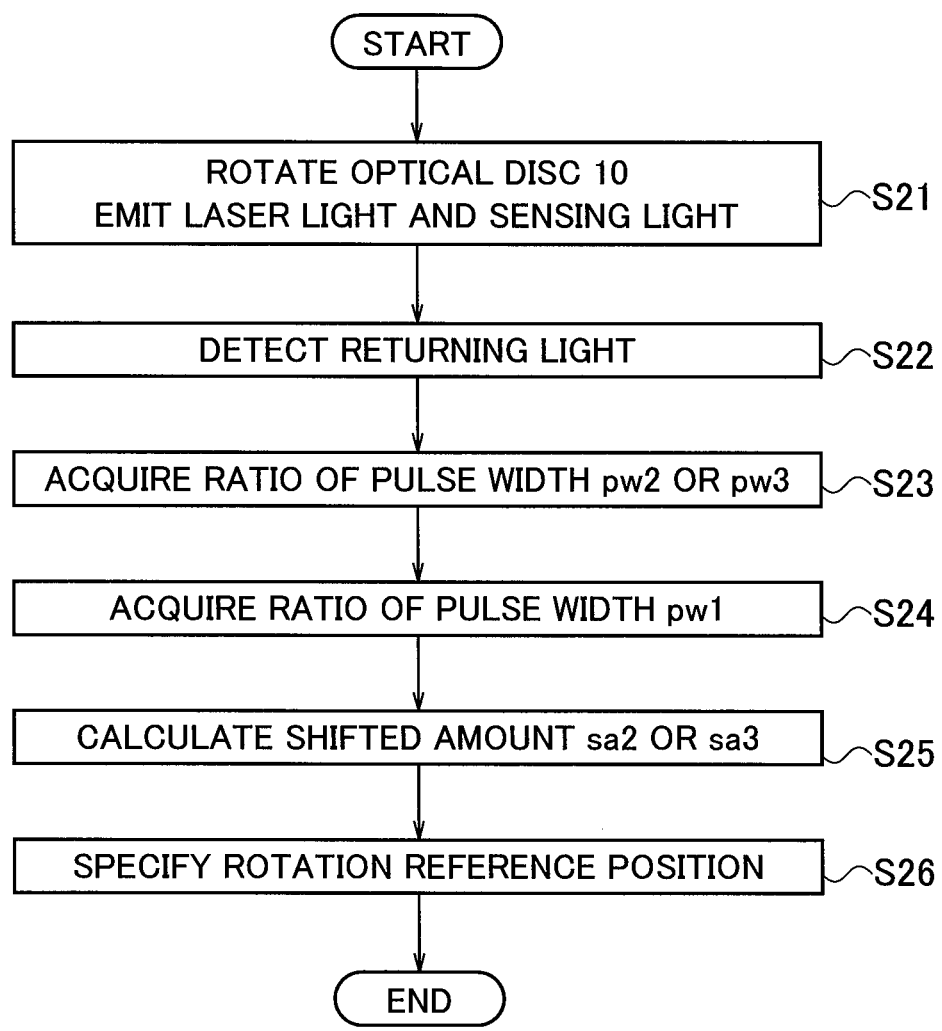
FIG. 6 is a flowchart illustrating the optical disc rotation position detection method of Example 2.

An optical disc rotation position detection method of Example 2 is described with reference to FIG. 4A, FIG. 4B, and the flowchart shown in FIG. 6. In step S21 in the flowchart shown in FIG. 6, the control circuit 6 controls the traverse mechanism 3 and the optical sensor 5. In particular, the control circuit 6 controls the traverse mechanism 3 to rotate the optical disc 10 and cause the optical pickup 33 to emit laser light to the optical disc 10. The control circuit 6 also controls the optical sensor 5 to emit sensing light to a region in the optical disc 10 in which the rotation reference mark 20 is located.

In step S22, the optical sensor 5 detects the returning light of the sensing light emitted to the optical disc 10 to generate an output signal. In step S23, the control circuit 6 extracts a detection signal of the rotation reference mark 20a as a pulse waveform from the output signal generated by the optical sensor 5, as shown in FIG. 4A or FIG. 4B. The control circuit 6 further acquires a pulse width pw2 or pw3 of the detection signal.

In particular, the control circuit 6 acquires a first period from the rising point (falling point) t21 or t31 of the pulse waveform to the falling point (rising point) t22 or t32 (corresponding to the pulse width pw2 or pw3), and a second period from the point t21 or t31 to the subsequent rising point (falling point) t21 or t31 of the pulse waveform detected next (a period during one rotation of the optical disc 10). The control circuit 6 calculates a ratio of the first period to the second period, so as to obtain a ratio of the pulse width pw2 or pw3. Namely, the ratio of the pulse width pw2 or pw3 is a ratio of the pulse width pw2 or pw3 to the period during one rotation of the optical disc 10.

A ratio of the pulse width pw1 of the detection signal when the optical sensor 5 is located at the targeted detection position dp1 can be calculated in accordance with the shape of the rotation reference mark 20a and the speed of rotation (rotation rate) of the optical disc 10 (the turntable 31).

In step S24, the control circuit 6 acquires a speed of rotation at the detection position dp1 in the optical disc 10 based on the speed of rotation of the turntable 31. The width of the rotation reference mark 20a at the targeted detection position dp1 can be preliminarily acquired according to the shape of the rotation reference mark 20a. The width of the rotation reference mark 20a at the targeted detection position dp1 corresponds to a distance between one end and the other end of the rotation reference mark 20a in the rotating direction of the optical disc 10 at the targeted detection position dp1.

A length for one rotation of the optical disc 10 at the targeted detection position dp1 can be preliminarily acquired. The ratio of the pulse width pw1 thus can be calculated by dividing the width of the rotation reference mark 20a at the targeted detection position dp1 by the length for one rotation of the optical disc 10.

The control circuit 6 acquires the ratio of the pulse width pw1 of the detection signal in accordance with the acquired speed of rotation, the width of the rotation reference mark 20a at the targeted detection position dp1, and the length for one rotation of the optical disc 10 at the targeted detection position dp1. The ratio of the pulse width pw1 is a ratio of the pulse width pw1 to the period during one rotation of the optical disc 10.

The control circuit 6 may calculate the ratio of the pulse width pw1 of the detection signal in accordance with the acquired speed of rotation and the width of the rotation reference mark 20a at the targeted detection position dp1. The control circuit 6 may store a lookup table in which the speed of rotation is associated with the ratio of the pulse width pw1 of the detection signal at the targeted detection position dp1. The control circuit 6 may acquire the ratio of the pulse width pw1 of the detection signal from the lookup table in accordance with the acquired speed of rotation.

In step S25, the control circuit 6 calculates the shifted amount sa2 or sa3 of the actual detection position dp2 or dp3 from the targeted detection position dp1 in accordance with the ratio of the pulse width pw1 and the ratio of the pulse width pw2 or pw3.

In step S26, the control circuit 6 specifies the rotation reference position on the optical disc 10 in accordance with the shifted amount sa2 or sa3 of the detection position dp2 or dp3 from the detection position dp1, the rising point (falling point) t21 or t31 of the pulse waveform, and the falling point (rising point) t22 or t32 of the pulse waveform.

The optical disc rotation position detection method of Example 2 described above can specify the rotation reference position on the optical disc 10 in accordance with the calculated shifted amount sa2 or sa3 even if the optical sensor 5 is shifted from the targeted detection position dp1 in the radial direction of the optical disc 10 due to the influence of oscillation of the casing 2.

Example 3

Figure 7A:
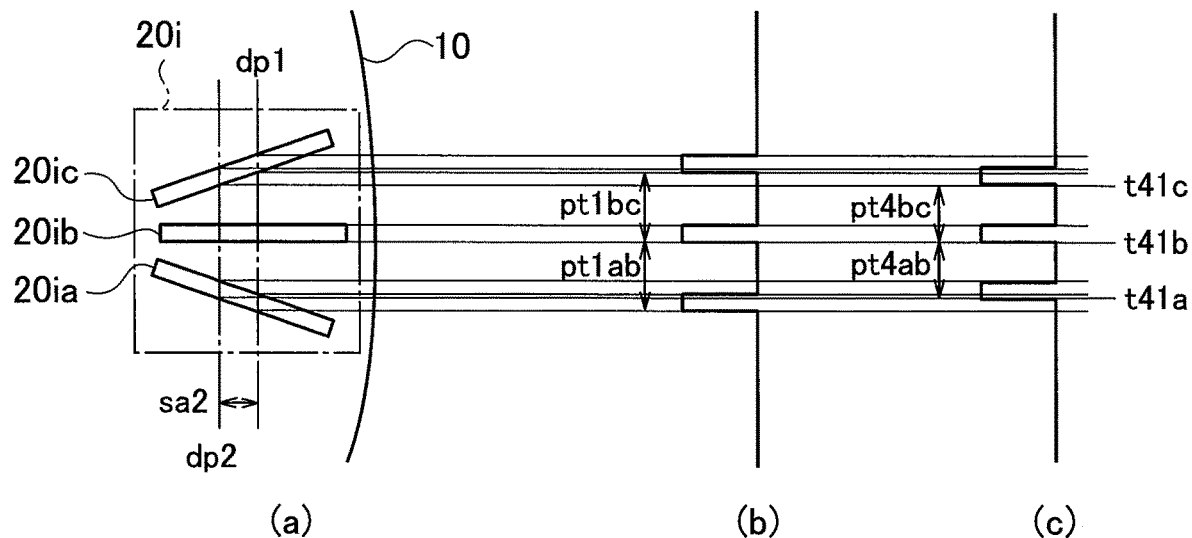
FIG. 7A is a view illustrating an optical disc rotation position detection method of Example 3.

An optical disc rotation position detection method of Example 3 is described with reference to FIG. 7A, FIG. 7B, and the flowchart shown in FIG. 8. FIG. 7A is a view illustrating a case in which the optical sensor 5 is shifted from the targeted detection position dp1 to the detection position dp2 toward the center (the rotational center C10) of the optical disc 10 when receiving the influence of oscillation of the casing 2. FIG. 7A corresponds to FIG. 4A.

Figure 7B:
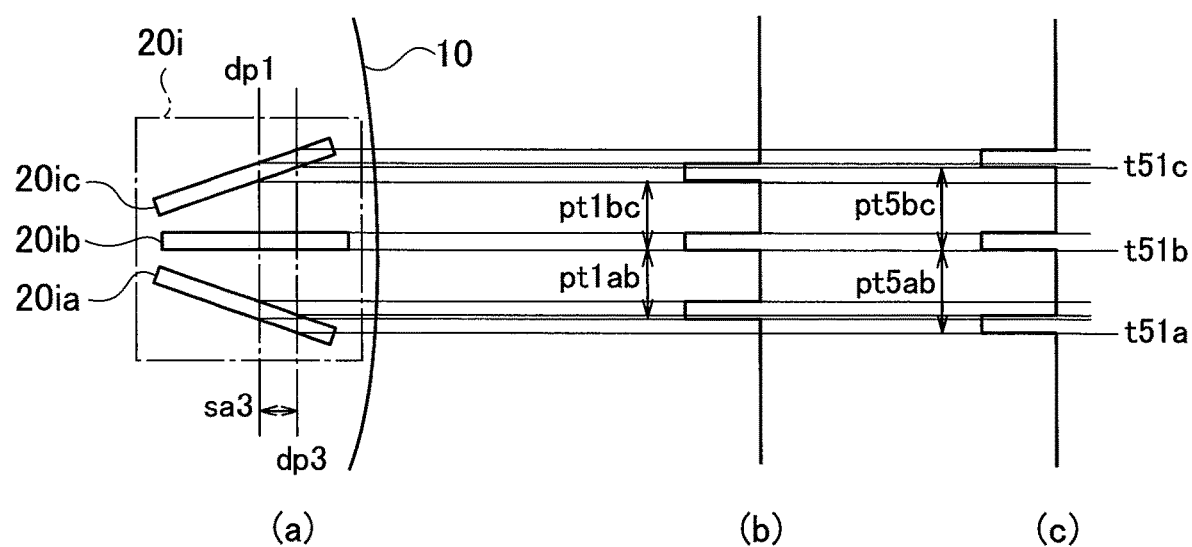
FIG. 7B is a view illustrating the optical disc rotation position detection method of Example 3.

FIG. 7B is a view illustrating a case in which the optical sensor 5 is shifted from the targeted detection position dp1 to the detection position dp3 toward the outer circumference of the optical disc 10 when receiving the influence of oscillation of the casing 2. FIG. 7B corresponds to FIG. 4B. FIG. 7A and FIG. 7B illustrate a state in which the rotation reference mark 20i shown in FIG. 3I is formed on the first surface 10a of the optical disc 10. The sections (a) to (c) in FIG. 7A and FIG. 7B correspond to the sections (a) to (c) in FIG. 4A and FIG. 4B.

Figure 8:
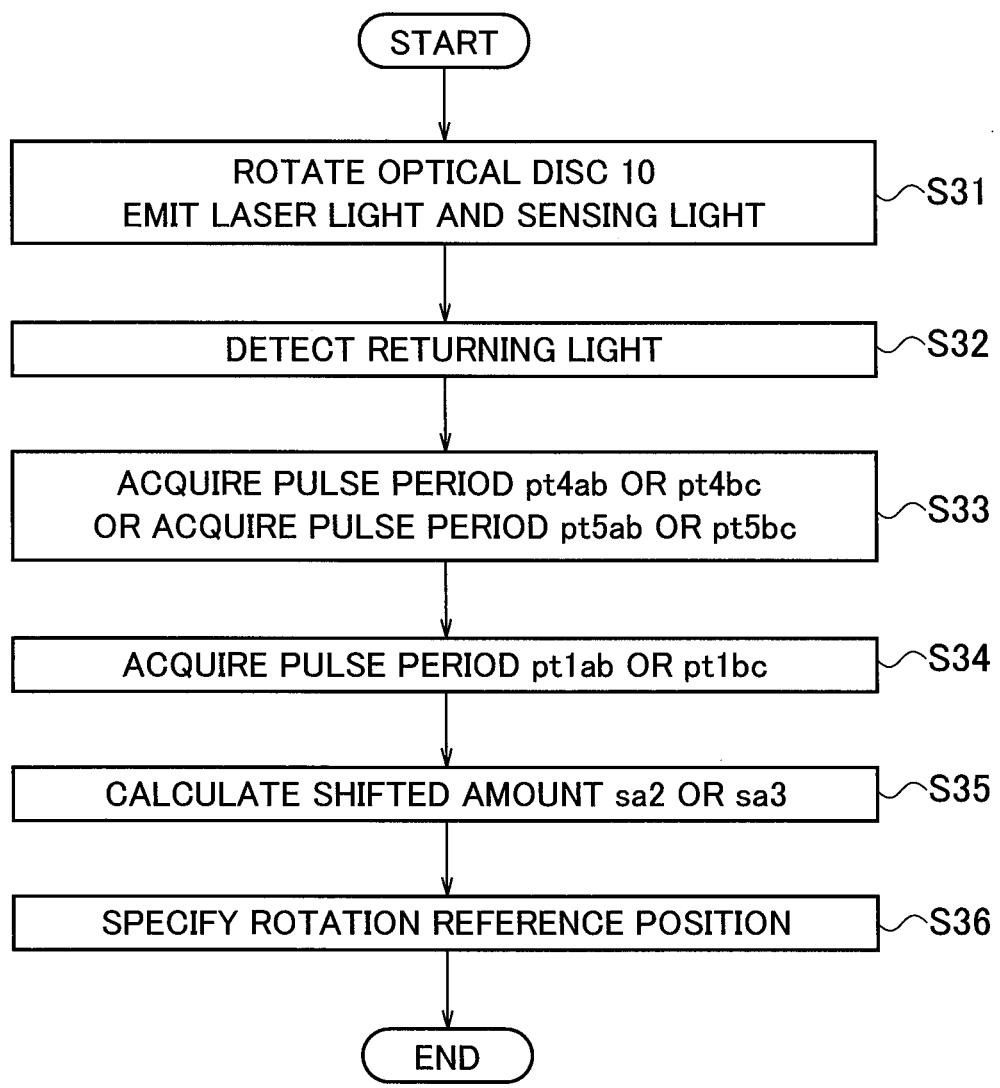
FIG. 8 is a flowchart illustrating the optical disc rotation position detection method of Example 3.

In step S31 in the flowchart shown in FIG. 8, the control circuit 6 controls the traverse mechanism 3 and the optical sensor 5. In particular, the control circuit 6 controls the traverse mechanism 3 to rotate the optical disc 10 and cause the optical pickup 33 to emit laser light to the optical disc 10. The control circuit 6 also controls the optical sensor 5 to emit sensing light to a region in the optical disc 10 in which the rotation reference mark 20 is located.

In step S32, the optical sensor 5 detects the returning light of the sensing light emitted to the optical disc 10 to generate an output signal. In step S33, the control circuit 6 extracts a detection signal of the rotation reference mark 20i as a pulse waveform from the output signal generated by the optical sensor 5, as shown in FIG. 7A or FIG. 7B. The detection signal of the rotation reference mark 20i has a plurality of pulse waveforms corresponding to the respective patterns 20ia to 20ic. The control circuit 6 further acquires a pulse interval pt4ab or pt4bc, or a pulse interval pt5ab or pt5bc of the detection signal.

With regard to the rotation reference mark 20i, for example, the control circuit 6 acquires a period (a third period) from a rising point (falling point) t41a or t51a of the pulse waveform corresponding to the pattern 20ia to a rising point (falling point) t41b or t51b of the pulse waveform corresponding to the pattern 20ib, or a period (a fourth period) from the rising point (falling point) t41b or t51b of the pulse waveform corresponding to the pattern 20ib to a rising point (falling point) t41c or t51c of the pulse waveform corresponding to the pattern 20ic. The control circuit 6 may acquire both of the third period and the fourth period.

While FIG. 7A and FIG. 7B illustrate the rectangular pulse waveforms, the rising point and the falling point of the respective waveforms are actually not sharpened. Example 3 acquires the period (the third and fourth periods) from the rising point (falling point) of the predetermined pulse waveform to the rising point (falling point) of the subsequent pulse waveform. This acquisition process can improve the precision of the acquired period, as compared with the case of acquiring the period from the rising point to the falling point of the predetermined pulse waveform.

The control circuit 6 can acquire the pulse interval pt4$ab$ or pt5$ab$ based on the third period. The control circuit 6 can acquire the pulse interval pt4$bc$ or pt5$bc$ based on the fourth period. The control circuit 6 may acquire both the pulse interval pt4$ab$ or pt4$bc$ and the pulse interval pt5$ab$ or pt5$bc$.

The pulse periods pt1$ab$ and pt1$bc$ of the detection signal when the optical sensor 5 is located at the targeted detection position dp1 can be calculated in accordance with the shape of the rotation reference mark 20$i$ and the speed of rotation (rotation rate) of the optical disc 10 (the turntable 31). In particular, the pulse interval pt1$ab$ can be calculated in accordance with the speed of rotation of the optical disc 10, and a distance (first distance) between the edge of the rotation reference mark 20$ia$ on the side away from the rotation reference mark 20$ib$ and the edge of the rotation reference mark 20$ib$ on the side closer to the rotation reference mark 20$ia$ at the targeted detection position dp1. The pulse interval pt1$bc$ can be calculated in accordance with the speed of rotation of the optical disc 10, and a distance (second distance) between the edge of the rotation reference mark 20$ib$ on the side away from the rotation reference mark 20$ic$ and the edge of the rotation reference mark 20$ic$ on the side closer to the rotation reference mark 20$ib$ at the targeted detection position dp1. The first and second distances can be preliminarily acquired.

In step S34, the control circuit 6 acquires a speed of rotation at the detection position dp1 in the optical disc 10 based on the speed of rotation of the turntable 31. The control circuit 6 acquires the pulse interval pt1$ab$ based on the acquired speed of rotation and the first distance, and acquires the pulse interval pt1$bc$ based on the acquired speed of rotation and the second distance.

The control circuit 6 may calculate the pulse interval pt1$ab$ based on the acquired speed of rotation and the first distance, and calculate the pulse interval pt1$bc$ based on the acquired speed of rotation and the second distance. The control circuit 6 may store a lookup table in which the speed of rotation is associated with the pulse periods pt1$ab$ and pt1$bc$ of the detection signal at the targeted detection position dp1. The control circuit 6 may acquire the pulse interval pt1$ab$ or pt1$bc$ of the detection signal from the lookup table in accordance with the acquired speed of rotation. The control circuit 6 may acquire the pulse periods pt1$ab$ and pt1$bc$ of the detection signal from the lookup table in accordance with the acquired speed of rotation.

In step S35, the control circuit 6 compares the pulse interval pt1$ab$ with the pulse interval pt4$ab$ or pt5$ab$ so as to calculate the shifted amount sa2 or sa3 (first shifted amount) of the actual detection position dp2 or dp3 from the targeted detection position dp1. The control circuit 6 compares the pulse interval pt1$bc$ with the pulse interval pt1$bc$ or pt5$bc$ so as to calculate the shifted amount sa2 or sa3 (second shifted amount) of the actual detection position dp2 or dp3 from the targeted detection position dp1.

The control circuit 6 may calculate the respective shifted amounts sa2 or sa3 (the first and second shifted amounts). The calculation of the plural shifted amounts sa2 or sa3 can improve the precision of the shifted amounts.

In step S36, the control circuit 6 specifies the rotation reference position on the optical disc 10 in accordance with the shifted amount sa2 or sa3 of the actual detection position dp2 or dp3 from the targeted detection position dp1, and the pulse waveform at the detection position dp2 or dp3.

The optical disc rotation position detection method of Example 3 described above can specify the rotation reference position on the optical disc 10 in accordance with the calculated shifted amount sa2 or sa3 even if the optical sensor 5 is shifted from the targeted detection position dp1 in the radial direction of the optical disc 10 due to the influence of oscillation of the casing 2.

While Example 3 is illustrated with the case of using the rotation reference mark 20$i$ shown in FIG. 3I, the rotation reference mark 20$j$ shown in FIG. 3J may be used instead. Namely, the rotation reference mark 20 used in Example 3 is only required to include the plural patterns arranged at intervals which change in width in the radial direction of the optical disc 10.

The rotation reference mark 20 used in Example 3 including the plural patterns arranged at intervals is formed such that a reflective film is deposited by masking and patterning, or a reflective member is printed or applied into a predetermined shape. The amount of the reflective film or the reflective member to be used can be decreased depending on the intervals arranged, reducing the material cost accordingly.

The optical disc device 1, the optical disc rotation position detection method, and the optical disc 10 according to the present embodiment enable the formation of the rotation mark 20 having a width changing in the radial direction of the optical disc 10, so as to extract the detection signal of the rotation reference mark 20 from the output signal of the optical sensor 5. The optical disc device 1, the optical disc rotation position detection method, and the optical disc 10 according to the present embodiment enable the calculation of the shifted amount of the detection position dp2 or dp3 from the targeted detection position dp1 based on the detection signal, so as to specify the rotation reference position on the optical disc 10 in accordance with the shifted amount.

The present embodiment providing the optical disc device 1, the optical disc rotation position detection method, and the optical disc 10 thus can accurately detect the reference position in the rotating direction of the optical disc having no address information even if the casing 2 is oscillated.

According to the optical disc device 1, the optical disc rotation position detection method, and the optical disc 10 of the present embodiment, the rotation reference mark 20 is formed on the first surface 10$a$ on the opposite side of the second surface 10$b$ on which the tracks for recording or reading out pieces of information, or the reaction regions are provided. The optical disc device 1, the optical disc rotation position detection method, and the optical disc 10 of the present embodiment thus enable the formation of the rotation reference mark having an optional shape at an optional position.

It should be understood that the present invention is not intended to be limited to the embodiment described above, and various modifications will be apparent to those skilled in the art without departing from the scope of the present invention.

Instead of the rotation reference mark, a notch may be formed having a shape corresponding to any of the rotation reference marks 20$a$ to 20$j$, for example, at the outer circumference of the optical disc 10. The use of the notch having the shape similar to the rotation reference mark 20 can achieve the effects similar to the rotation reference mark 20. However, such a notch could lead the center of gravity of the optical disc 10 to be shifted from the rotational center C10, as compared with the rotation reference mark 20. The rotation reference mark 20 is thus preferred so as to avoid the shift of the center of gravity of the optical disc 10 from the rotational center C10 to prevent rotational runout of the optical disc 10.

What is claimed is:

1. An optical disc device, comprising:
   an optical disc rotation drive unit configured to rotate an optical disc provided with a rotation reference mark having optical reflectivity and being formed on an upper portion of a first surface of the optical disc;
   an optical sensor configured to detect the rotation reference mark by emitting sensing light to a region of the optical disc where the rotation reference mark is located; and
   a control circuit configured to control the optical disc rotation drive unit and the optical sensor,
   the rotation reference mark being formed into a shape having a width changing in a radial direction of the optical disc,
   the control circuit being configured to extract a detection signal of the rotation reference mark as a pulse waveform from an output signal of the optical sensor with the optical disc being rotated, calculate a shifted amount of an actual detection position from a targeted detection position in accordance with the pulse waveform, and specify a rotation reference position, which is a reference position in a rotation direction, of the optical disc in accordance with the shifted amount.

2. An optical disc rotation position detection method, comprising:
   causing an optical disc rotation drive unit to rotate an optical disc provided with a rotation reference mark having optical reflectivity and being formed into a shape having a width changing in a radial direction, and being formed on an upper portion of a first surface of the optical disc;
   causing an optical sensor to detect the rotation reference mark by emitting sensing light to a region of the optical disc where the rotation reference mark is located; and
   causing a control circuit to extract a detection signal of the rotation reference mark as a pulse waveform from an output signal of the optical sensor with the optical disc being rotated, calculate a shifted amount of an actual detection position from a targeted detection position in accordance with the pulse waveform, and specify a rotation reference position, which is a reference position in a rotation direction, of the optical disc in accordance with the shifted amount.

* * * * *